(12) United States Patent
Berns, Jr. et al.

(10) Patent No.: US 6,978,706 B2
(45) Date of Patent: Dec. 27, 2005

(54) MACHINE TOOL SPINDLE LINERS AND METHODS FOR MAKING SAME

(75) Inventors: Joseph F. Berns, Jr., Cincinnati, OH (US); Joseph P. Berns, Mason, OH (US); Gary Wildt, Erlanger, KY (US)

(73) Assignee: J. F. Berns Co., Inc., Cincinnati, OH (US)

( * ) Notice: Subject to any disclaimer, the term of this patent is extended or adjusted under 35 U.S.C. 154(b) by 31 days.

(21) Appl. No.: 10/304,485

(22) Filed: Nov. 26, 2002

(65) Prior Publication Data

US 2003/0101855 A1    Jun. 5, 2003

Related U.S. Application Data

(60) Provisional application No. 60/334,565, filed on Nov. 30, 2001.

(51) Int. Cl.[7] .............................................. B23B 13/08
(52) U.S. Cl. ............................ 82/163; 82/127; 82/147
(58) Field of Search .......................... 82/126, 127, 147, 82/124, 152, 903, 163, 142, 162

(56) References Cited

U.S. PATENT DOCUMENTS

| | | | | |
|---|---|---|---|---|
| 3,930,568 A | * | 1/1976 | Levey | 193/38 |
| 4,058,036 A | | 11/1977 | Austin | 82/38 |
| 4,131,964 A | * | 1/1979 | Cottingham | 470/164 |
| 4,149,437 A | | 4/1979 | Winberg et al. | 82/38 |
| 4,526,072 A | | 7/1985 | Manhoff, Jr. | 81/451 |
| 4,788,895 A | | 12/1988 | Spooner | 82/38 |
| 4,870,880 A | | 10/1989 | Cantabery | 82/124 |
| 4,930,381 A | | 6/1990 | Spooner | 82/163 |
| 5,649,460 A | | 7/1997 | Berns et al. | 82/126 |
| 5,927,169 A | * | 7/1999 | Hinson | 82/163 |
| 6,227,084 B1 | | 5/2001 | Cucchi | 82/126 |
| 6,634,263 B2 | * | 10/2003 | Trusty et al. | 82/1.11 |

* cited by examiner

*Primary Examiner*—Willmon Fridie, Jr.

(57) ABSTRACT

A spindle liner for a turning machine has an elongated polymeric member sized to fit within the inner diameter of a spindle and further has a bore through the polymeric member sized and shaped to receive a given size bar stock. The spindle liner may be installed within a spindle and bolted to a spindle flange by an adapter fixed to the spindle liner so that the spindle liner rotates with the spindle. The spindle liner attenuates noise and vibration of the rotating bar stock and eliminates whipping of the free end of the bar stock.

17 Claims, 3 Drawing Sheets

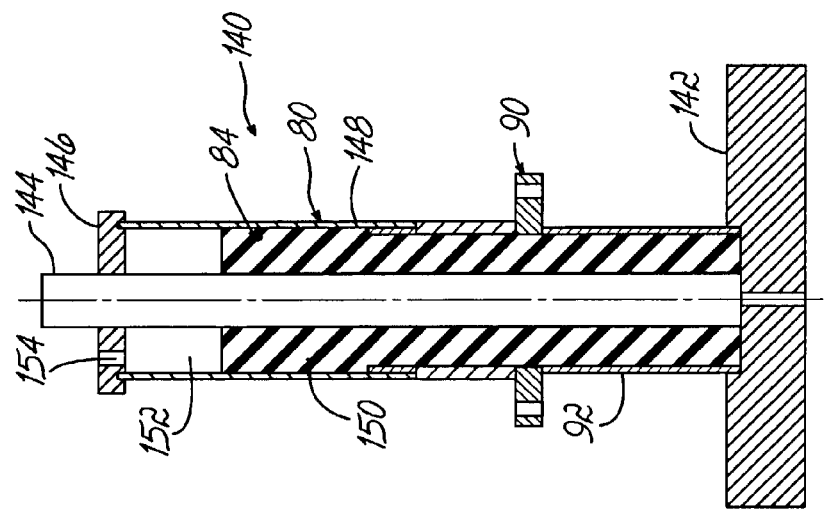
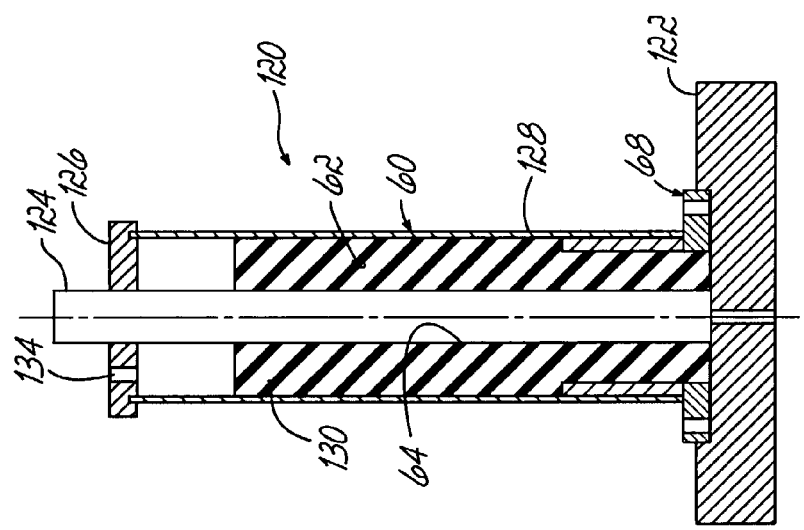
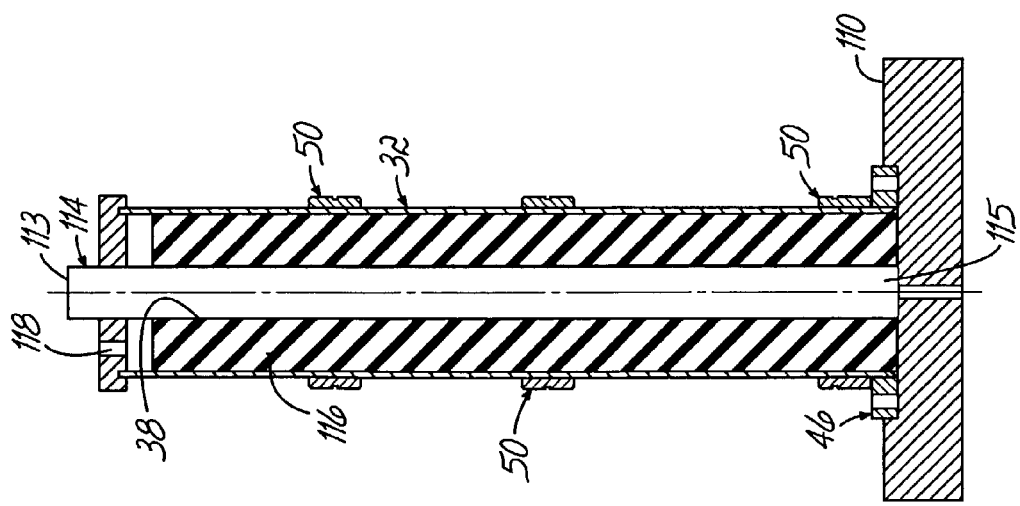
FIG. 5
FIG. 6
FIG. 7

MACHINE TOOL SPINDLE LINERS AND METHODS FOR MAKING SAME

CROSS-REFERENCE TO RELATED APPLICATIONS

This application claims the benefit of U.S. Provisional Application No. 60/334,565 filed on Nov. 30, 2001, and the disclosure of which is hereby incorporated by reference herein.

FIELD OF THE INVENTION

The present invention pertains to machine tools for fabricating products from bar stock of all types of cross-sectional shapes and materials, and more particularly to a spindle liner for a turning machine.

BACKGROUND OF THE INVENTION

Turning machines, such as lathes, are widely used in industry to produce manufactured parts from bar stock of various shapes and materials. In general, a turning machine has a revolving spindle supported on a headstock of the machine. The spindle has a hollow center through which raw material in the form of bar stock is fed. The bar stock is held at the machining end of the spindle by a work holder fixedly attached to that end of the spindle, and the remainder of the bar stock extends through the hollow center of the spindle.

When the machine is used to perform operations on bar stock having a diameter that is only slightly smaller than the inner diameter of the spindle's hollow center, the bar stock is substantially supported by the spindle. However, if the diameter of the bar stock is too much smaller than the inner diameter of the spindle, the bar stock will be substantially unsupported by the spindle and may be subjected to bending and inertial forces which cause a whipping action of the unsupported length of the bar stock. This whipping action creates undesirable vibration at the machining end of the bar stock, making it difficult to machine properly by holding the required tolerances. Furthermore, the bar stock may contact the inside of the spindle, substantially increasing shop noise and potentially damaging the machine and the surface of the bar stock.

To address the problems associated with supporting and machining bar stock in turning machines, spindle liners (also referred to as filler tubes or reduction tubes) have been used to provide support of smaller size bar stock in machine spindles. Spindle liners are generally tubular in construction, with an outer diameter sized for a close slip fit into the spindle and an inner diameter sized for a close, clearance fit of the bar stock. Spindle liners are typically made from steel and are provided in various sizes to accommodate corresponding sizes of raw material.

Spindle liners can also be formed from polymeric materials, such as urethane. Polymeric spindle liners are convenient in that special shapes may be readily molded into the inner diameter to correspond to various shapes of bar stock, such as square or hex shapes. But these polymeric spindle liners have several drawbacks. For example, polymeric materials can "cold flow" under bolt clamping loads and thereby prevent a secure connection to a spindle flange. Because polymeric materials are not as strong as metal materials, the walls of a polymeric spindle liner must be made thicker than a corresponding metal spindle liner, especially when the length of the spindle liner extends beyond the end of the spindle. Having thicker walls diminishes the maximum capacity of bar stock which may be received by a polymeric spindle liner. Furthermore, machining the outer diameter of a spindle liner is generally more difficult when the material is polymeric. This can be problematic when a spindle liner must be re-worked to obtain a tight fit to a particular spindle's inner diameter, which can vary by as much as ±0.01 inch due to standard manufacturing tolerances.

A need exists for a spindle liner which has advantages of both metal and polymeric spindle liners and which solves various problems in the art such as those mentioned above.

SUMMARY OF THE INVENTION

The present invention provides a spindle liner for use in a turning machine to support bar stock in a spindle of the machine and which provides an accurate fit and a secure attachment to the spindle while also achieving other desirable objectives. The spindle liner has a tubular polymeric member with a central bore sized and shaped to receive a desired size bar stock material. The outer diameter of the polymeric member may be sized to slip fit inside a spindle whereby the spindle liner may be inserted into the in-feed side of a machine spindle to reduce the inner diameter of the spindle and thereby accommodate the smaller size bar stock. The material for the polymeric member may be selected to provide dampening of noise and vibration caused by the rotation of the bar stock in the spindle. In one exemplary embodiment, the polymeric member is made from urethane.

In one embodiment, the spindle liner further includes an adapter fixedly attached to the spindle liner for coupling the spindle liner to a flange on a machine spindle. For example, the adapter may have a bolt hole pattern which corresponds to the hole pattern on the spindle flange, whereby the adapter may be fastened to the flange so that the spindle liner will rotate with the spindle. Advantageously, the adapter may be made at least partially from a material which is harder than the material of the polymeric member, such as metal, ceramic, or other similarly hard material, whereby the adapter may be securely bolted to the spindle flange.

In one exemplary embodiment, the adapter is fixed to an end of the spindle liner. In another exemplary embodiment, the adapter is fixed to the spindle liner a distance from one end, such that a portion of the installed spindle liner extends beyond the end of the spindle. This extended portion advantageously provides support for bar stock material which is longer than the spindle itself, thereby increasing the length of material which can be fed into the machine.

In another exemplary embodiment, a spindle liner according to the present invention further includes a metal sleeve and the polymeric member is coupled to an inner surface of the sleeve. The spindle liner also includes one or more bushings fixed to the outer surface of the sleeve. The bushings may have circumferential grooves for receiving O-rings about the bushings. The spindle liner may be inserted into a spindle and the bushings and O-rings provide a tight fit with the spindle.

In accordance with the present invention, a method for making a spindle liner having a polymeric portion and an adapter includes the steps of coupling the adapter to a mold configured to produce the polymeric portion of the spindle liner, transferring polymer to the mold, curing the polymer, and removing the cured polymer and adapter from the mold as a unit.

Another method for making a spindle liner having a polymeric portion and an adapter includes the steps of applying adhesive to at least one of the adapter and the polymeric portion and joining the polymeric portion and the adapter.

These and other advantages, objectives and features of the invention will become more readily apparent to those of ordinary skill upon review of the following detailed description of an illustrative embodiment of the invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 5 is a section view of a mold for making an exemplary spindle liner as depicted in FIG. 2;

FIG. 6 is a section view of a mold for making an exemplary spindle liner as depicted in FIG. 3; and FIG. 7 is a section view of a mold for making an exemplary spindle liner as depicted in FIG. 4.

DETAILED DESCRIPTION

Figure 1:
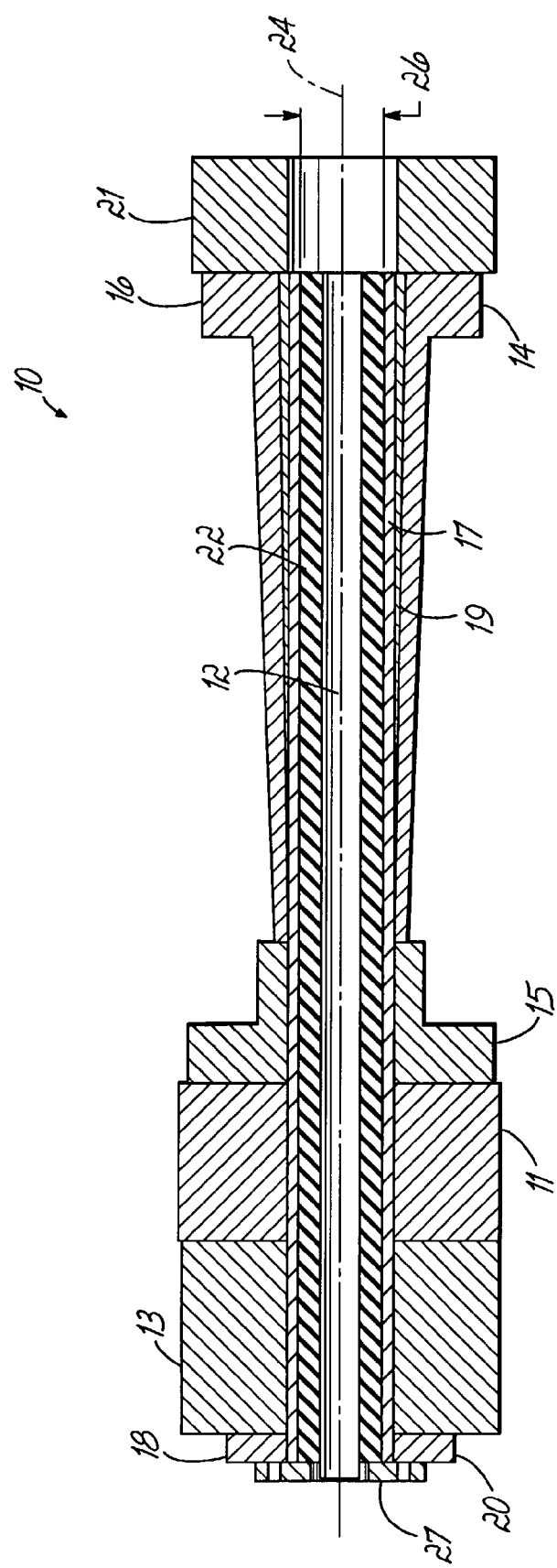
FIG. 1 is a section view of a typical turning machine spindle depicting a spindle liner installed in the spindle.

Referring to FIG. 1 there is shown a typical turning machine spindle 10, including a hydraulic rotating cylinder 11, a cylinder housing 13, a cylinder adapter 15, a draw tube 17, and a spindle bore 19. The spindle 10 is shown with an exemplary spindle liner 22 of the present invention installed in the draw tube 17. The rotating spindle 10 is generally supported in a headstock of a turning machine. The spindle 10 further includes a first flange 14 located at a first, machining end 16 of the spindle 10 and a second flange 18, opposite the first flange 14, at a second end 20 of the spindle 10. The draw tube 17 extends along a longitudinal axis 24 of the spindle 10, from the first end 16 to the second end 20. The draw tube 17 receives infed bar stock material (not shown) at the second end 20 so that it may be machined by a tool near the first end 16 of the spindle 10. A work piece holder 21, such as a collet or chuck, may be bolted to the first flange 14 of the spindle 10 to support and hold the infed bar stock as it is being machined. The remainder of the bar stock extends through the spindle 10, toward the second end 20.

When the bar stock to be machined has an outer diameter substantially smaller than the inner diameter 26 of the draw tube 17, a spindle liner 22 according to the present invention may be installed within the spindle 10 to support the bar stock material. The spindle liner 22 has a central bore 12 and is inserted into the draw tube 17 at the second end 20 of the spindle 10. Spindle liner 22 includes an adapter 27 which may be fastened to the second flange 18 so that the spindle liner 22 rotates with the spindle 10.

Figure 2:
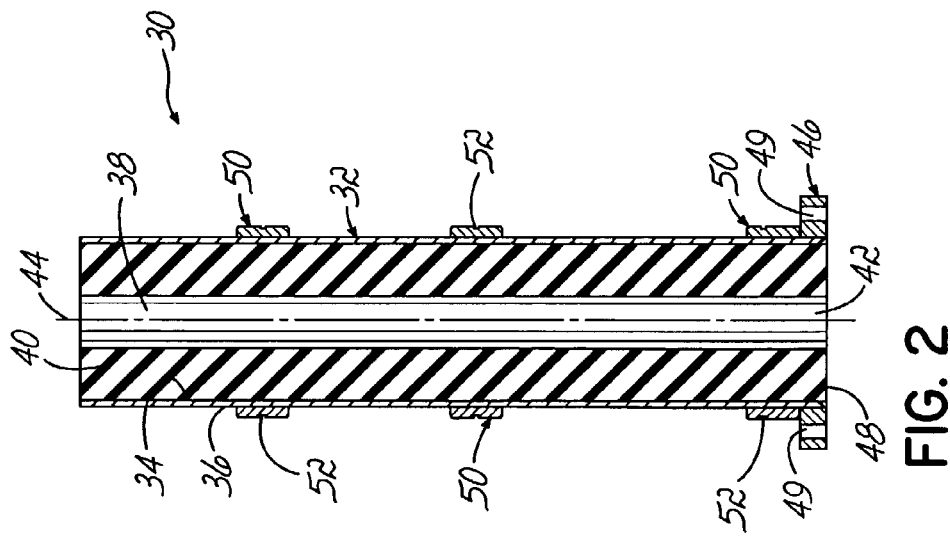
FIG. 2 is section view of an exemplary embodiment of a spindle liner according to the present invention.

Referring to FIG. 2 an exemplary spindle liner 30 according to the present invention is shown. The spindle liner 30 includes an elongated metal sleeve 32 having an inner surface 34 and an outer surface 36. A polymeric core 40 is disposed within an interior portion 38 of the sleeve 32. The polymeric core 40 may be coupled to the inner surface 34 of sleeve 32 and extends along the length of the sleeve 32. The polymeric core 40 has a bore 42 that extends along a longitudinal axis 44 of the polymeric core 40. The bore 42 may be sized to provide a close, clearance fit for a given size bar stock inserted into the bore 42. The bore 42 may also be shaped to correspond to various bar stock configurations. For example, the bore 42 may be cross-sectionally shaped to receive square, triangular, round, hexagonal, or various other cross-sectional shapes of bar stock material.

An adapter 46 may be fixed to one end 48 of the sleeve 32 for fastening the spindle liner 30 to the second flange 18 of the spindle 10. Advantageously, the adapter 46 may be made at least partially from a material which is harder than the polymeric core 40, so that the adapter 46 may be securely fastened to the second flange 18, such as by bolting, and thereby transfer rotational motion of the spindle 10 (FIG. 1) to the spindle liner 30. For example, the adapter 46 may be made of metal, ceramic, or other material which is capable of handling bolt clamping loads without cold flow concerns. Alternatively, the adapter 46 may be made from a polymeric material with metal bushings, or other similarly hard material, pressed or molded into bolt holes for fastening to the second flange 18. In the exemplary embodiment of FIG. 2, the adapter 46 is made of metal and has through-holes 49 sized to receive bolts for fastening to the second flange 18 (FIG. 1).

While the polymeric core 40 of the spindle liner 30 shown in FIG. 2 extends through the adapter 46, an alternative arrangement may include an adapter having a central hole sized closely to the bore 42 such that a lead-in chamfer to the spindle liner 30 is metal, i.e., the material of the adapter. Advantageously, a metal lead-in chamfer will break any burrs that may be on the bar stock as it is fed into the spindle liner 30.

The spindle liner 30 further includes one or more circumferential bushings 50 positioned along the length of the metal sleeve 32 and sized to provide a snug fit with the inner diameter 26 of the spindle 10. In an exemplary embodiment, each bushing 50 further includes a circumferential groove 52 shaped to receive an O-ring placed around the bushing 50, as shown in FIG. 2. The bushings 50 with circumferential grooves 52 are sized such that, when fitted with O-rings, the spindle liner 30 may be inserted within the spindle 10 (FIG. 1) and the O-rings will provide a snug fit of the spindle liner 30 to the inner diameter 26 of the spindle 10. When the spindle liner 30 is inserted into the spindle 10 in this manner, and the adapter 46 is bolted to the second flange 18 of the spindle 10, the spindle liner 30 will rotate with the spindle 10.

The polymeric core 40 of the spindle liner 30 may be bonded to the inner surface 34 of the metal sleeve 32 by a bonding agent, such as a primer or an adhesive, that has been applied to the inner surface 34 of the sleeve 32 prior to introduction of the polymeric core 40 within the sleeve 32. In the exemplary embodiment of the present invention, the polymeric core 40 comprises a urethane material. The urethane, or other polymeric material, may be selected to provide dampening to the spindle liner 30. Various dampening characteristics may be provided by proper selection of the polymeric material. Advantageously, the dampening characteristics exhibited by the polymeric material may be used to attenuate or dampen noise and vibration that otherwise would be produced by the bar stock material as it rotates with the spindle 10 inside the spindle liner 30. The present invention accordingly provides dampening and support of bar stock material within the spindle 10 to eliminate the whipping effect caused by inertial and gravitational forces on the bar stock as it is rotated in the spindle 10 (FIG. 1).

Figure 3:
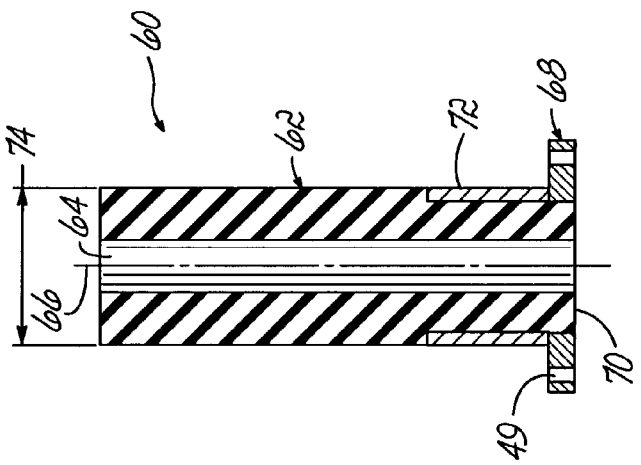
FIG. 3 is a section view of another exemplary embodiment of a spindle liner according to the present invention.

FIG. 3 depicts another exemplary spindle liner 60 of present invention. In this exemplary embodiment, the spindle liner 60 comprises an elongate polymeric member 62 having a bore 64 through the member along a longitudinal axis 66, and further comprises an adapter 68 fixedly attached to an end 70 of the polymeric member 62 and configured to provide an attachment to the second flange 18 of a spindle 10 (FIG. 1). Advantageously, the adapter 68 may be made at least partially from a material which is harder than the polymeric member 62, so that the adapter 68 may be securely fastened to the second flange 18, such as by bolting, and thereby transfer rotational motion of the spindle 10 to the spindle liner 30, as described above with respect to FIG. 2. For example, the adapter 68 may be made from metal, ceramic, or other material which is capable of handling bolt clamping loads without cold flow concerns. Alternatively, the adapter 68 may be made from a polymeric material with metal bushings, or other similarly hard material, pressed or molded into bolt holes for fastening to the second flange 18. In the exemplary spindle liner 60 depicted in FIG. 3, the adapter 68 is made of metal and includes bolt holes 49 and a collar portion 72 which extends along a length of the polymeric member 62. Collar portion 72 is also preferably formed of a material, such as metal, which is harder than the material which forms polymeric member 62.

Advantageously, the polymeric material comprising the polymeric member 62 may be selected to provide desired dampening characteristics to the spindle liner 60, and in an exemplary embodiment, the polymeric member 62 comprises urethane. The polymeric member 62 may be bonded to the adapter 68 by a bonding agent, such as a primer or an adhesive, that has been applied to the interface of the polymeric member 62 and the adapter 68. An outer diameter 74 of the spindle liner 60 may be sized to provide a slip fit with the inner diameter 26 of the spindle 10. No O-rings or bushings are required to provide a tight fit with the spindle 10 and the spindle liner 60 may be fastened to the second flange 18 of the spindle 10 such that the spindle liner 60 rotates with the spindle 10 (FIG. 1).

Figure 4:
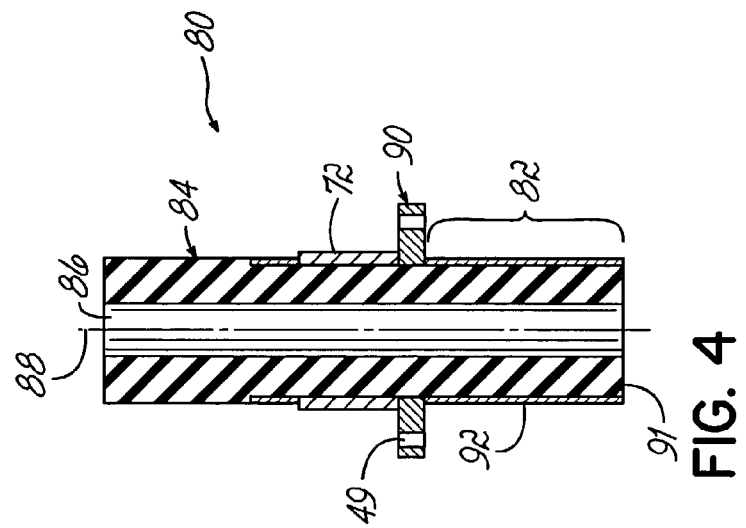
FIG. 4 is a section view of another exemplary embodiment of a spindle liner of the present invention, having an extension.

Referring to FIG. 4, another exemplary spindle liner 80 of the present invention is shown. In this embodiment the spindle liner 80 extends beyond the second end 20 of the spindle 10 (FIG. 1) to provide an extended portion 82 for supporting infed bar stock material (not shown), whereby lengths of bar stock material longer than the spindle 10 may be received and supported in the spindle liner 80. Advantageously, the spindle liner 80 permits a turning machine to utilize longer lengths of bar stock which otherwise would extend, unsupported, out of the second end 20 of the spindle 10. The spindle liner 80 includes an elongated polymeric member 84, having a bore 86 extending through the polymeric member 84 along a longitudinal axis 88. The polymeric member 84 comprises a polymeric material which may be selected to provide dampening to the spindle liner 80, and in one exemplary embodiment, the polymeric material comprises urethane.

An adapter 90 is fixedly attached to the spindle liner 80 along the length of the polymeric member 84, such that the extended portion 82 of the spindle liner 80 extends beyond the adapter 90 at an end 91 of the spindle liner 80. The adapter 90 may be made at least partially from a material which is harder than the polymeric member 84 so that the adapter 90 may be securely fastened to the second flange 18, such as by bolting, and thereby transfer rotational motion of the spindle 10 to the spindle liner 80. For example, the adapter 90 may be made from metal, ceramic, or other material as described above for exemplary spindle liners 30 and 60.

In the exemplary spindle liner 80 of FIG. 4, the adapter 90 is made from metal and includes bolt holes 49 for fastening the spindle liner 80 to the second flange 18 of spindle 10 (FIG. 1). The adapter 90 further includes a collar 72 and a metal sleeve 92 proximate an outer surface 94 of the polymeric member 84. The metal sleeve 92 spans at least the length of the extended portion 82 to provide sufficient support of long bar stock that extends beyond the second flange 18 of spindle 10. A bonding agent, such as a primer or an adhesive, may be applied to the adapter 90, the collar 72, and the sleeve 92 to bond these components to the polymeric member 84.

The various exemplary embodiments of spindle liners 30, 60, 80 described above and with regard to FIGS. 2–4 may be fabricated by various methods. For example, the polymeric portions 40, 62, 84 of the spindle liners 30, 60, 80, respectively, may be formed by molding, extruding, or machining and then may be subsequently joined with the various other components to produce the spindle liners 30, 60, 80. Alternatively, the polymeric portions 40, 62, 84 may be molded directly with the other components by utilizing molds which position the components and form the polymeric members 40, 62, 84. Polymer may then be transferred to the molds and permitted to cure, whereby the finished spindle liners 30, 60, 80 may be removed from the molds. To provide a bond between the polymeric portions and other components of the spindle liners 40, 60, 80, a bonding agent, such as an adhesive or a primer, may be applied to the areas of the components that will come in contact with the polymeric portions 40, 62, 84.

Referring to FIG. 5, an exemplary method for making the exemplary spindle liner 30 depicted in FIG. 2 will now be discussed. A mold 100 for making a spindle liner 30 according to the present invention includes a mold base 110 and a mold cap 112 configured to engage the end portions of the spindle liner 30. The mold 100 further includes a mold core 114 which is configured to be received at its ends 113, 115 by the mold base 110 and the mold cap 112. The mold core 114 forms the shape and size of the bore 42 in the spindle liner 30 and therefore may be of round, hexagonal, square, or other cross-section as required.

To form the spindle liner 30, the metal sleeve 32, adapter 46, and circumferential bushings 50 are positioned on the mold base 110 and the mold core 114 is positioned within the interior portion 38 of the sleeve 32 to mate with the mold base 110. Polymer 116, such as urethane, is then transferred to the interior portion 38 of the sleeve 32 to surround the mold core 114 and the mold cap 112 is fitted over the mold core 114 and against the sleeve 32 to center the mold core 114 within the sleeve 32. Alternatively, the cap 112 may be placed on the end of the sleeve 32 to center the mold core 114 and polymer 116 may be transferred to the interior portion 38 of the sleeve 32 through a sprue 118 in the mold cap 112. When the polymer 116 has sufficiently cured, the cap 112 and mold core 114 may be removed from the mold 100 and the finished spindle liner 30 may be removed from the mold base 110.

FIG. 6 illustrates an exemplary method of producing the spindle liner 60 depicted in FIG. 3. The spindle liner 60 may be formed in a mold 120 comprising a mold base 122, a mold core 124, and a mold cap 126, similar to that described above for FIG. 5. The mold 120 further includes a tubular shell 128 which serves to form the polymeric member 62 of the spindle liner 60. To produce this embodiment, the adapter 68 is fitted to the mold base 122 and the mold shell 128 and core 124 are positioned on the mold base 122 to define the outer surface 94 and bore 64 of the polymeric member 62. Polymer 130, such as urethane, may then be transferred to the interior of the mold shell 128 and the mold cap 126 placed adjacent the shell 128 to center the mold core 124. Alternatively, the mold cap 126 may be fitted to the mold shell 128 to center the mold core 124 and polymer 130 may be transferred to the interior of the shell 128 through a sprue 134 in the mold cap 126. When the polymer 130 has cured, the cap 126 and core 124 may be removed from the mold base 122 and the finished spindle liner 60 may be pushed from the mold shell 128.

FIG. 7 illustrates an exemplary method for producing the spindle liner 80 as depicted in FIG. 4. This method uses a mold 140 comprising a mold base 142, a mold core 144, a mold cap 146 and an outer shell 148 similar to that described above for FIG. 6. The adapter 90 and sleeve 92 are fitted to the mold base 142 and the mold core 144 is positioned on the base 142 proximate the center of the adapter 90. The mold shell 148 is then fitted against the adapter 90 and polymer 150 is transferred to the annular space 152 defined by the sleeve 92, the mold shell 148, and the mold core 144. The mold cap 146 may then be placed over the mold shell 148 to receive and center the mold core 144. Alternatively, the mold cap 146 may be placed over the mold shell 148 and then polymer 150 may be transferred to the annular space 152 through a sprue 154 in the mold cap 146. When the polymer 150 has sufficiently cured, the mold cap 146 and core 144 may be removed from the mold 140. The mold shell 148 and spindle liner 80 may then be removed from the base 142 and the finished spindle liner 80 pushed out of the mold shell 148.

While the present invention has been illustrated by the description of various embodiments thereof, and while the embodiments have been described in considerable detail, it is not intended to restrict or in any way limit the scope of the appended claims to such detail. Additional advantages and modifications will readily appear to those skilled in the art. For example, while methods for making exemplary spindle liners have been described herein to include filling a mold through a sprue located in a top portion of the mold, one of ordinary skill in the art will understand that various other methods may be utilized to produce spindle liners of the present invention, such as filling a mold through a sprue located in a bottom portion of the mold.

As another example, while an adapter for attaching a spindle liner to a spindle flange has been described herein as having bolt holes for bolting to the flange, the adapter may be configured to provide other means of attachment. For example, the adapter may be configured to have slots, or it may be configured to be attached to a spindle using a "quick-change" assembly as described in U.S. Pat. No. 5,649,460, commonly held by the assignee of the present application and herein incorporated by reference in its entirety.

The invention in its broader aspects is therefore not limited to the specific details, representative apparatus and methods and illustrative examples shown and described. Accordingly, departures may be made from such details without departing from the scope or spirit of Applicants' general inventive concept. The various features of the different embodiments may be combined in different manners depending on the desired effect or result.

What is claimed is:

1. A spindle liner for a turning machine having a spindle, the spindle liner comprising:
    an elongated metal sleeve configured to be coupled with the spindle and having an inner surface, a first end and a second end;
    a polymeric core coupled to said inner surface of said sleeve and extending along said sleeve a distance substantially at least as long as said sleeve, said polymeric member having a longitudinal axis; and
    a bore in said polymeric core extending along said longitudinal axis of said polymeric core for holding a length of bar stock.

2. The spindle liner of claim 1 wherein said bore is configured with one of a circular or a polygonal cross-sectional shape.

3. A spindle liner for a turning machine having a spindle, the spindle liner comprising:
    an elongated metal sleeve configured to be coupled with the spindle and having an inner surface, a first end and a second end;
    a polymeric core coupled to said inner surface of said sleeve and extending along at least a portion of said sleeve, said polymeric core having a longitudinal axis;
    a bore in said polymeric core extending along said longitudinal axis of said polymeric core for holding a length of bar stock; and
    a bonding agent between said sleeve and said polymeric core, said bonding agent bonding said polymeric core to said sleeve.

4. The spindle liner of claim 1 wherein said polymeric core comprises urethane.

5. The spindle liner of claim 1, further comprising:
    an adapter fixed proximate one of said first and second ends of said sleeve and configured to be fastened to the spindle.

6. A spindle liner for a turning machine having a spindle, the spindle liner comprising:
    an elongated metal sleeve configured to be coupled with the spindle and having an inner surface, a first end and a second end;
    a polymeric core coupled to said inner surface of said sleeve and extending along at least a portion of said sleeve, said polymeric member having a longitudinal axis;
    a bore in said polymeric core extending along said longitudinal axis of said polymeric core for holding a length of bar stock; and
    an adapter fixed to said sleeve intermediate said first and second ends, such that when said spindle liner is installed in the spindle a portion of said sleeve extends beyond an end of the spindle.

7. The spindle liner of claim 1, wherein said sleeve has an outer surface and further comprising:
    at least one bushing on said outer surface of said sleeve.

8. A spindle liner for a turning machine having a spindle, the spindle liner comprising:
    an elongated metal sleeve configured to be coupled with the spindle and having an inner surface, an outer surface, a first end, and a second end;
    a polymeric core coupled to said inner surface of said sleeve and extending along at least a portion of said sleeve, said polymeric member having a longitudinal axis;
    a bore in said polymeric core extending along said longitudinal axis of said polymeric core for holding a length of bar stock;

at least one bushing on said outer surface of said sleeve; and a circumferential groove on said bushing for receiving an O-ring.

9. A spindle liner for a turning machine, the spindle liner comprising:
   an elongated polymeric member having first and second ends and a longitudinal axis extending from said first end to said second end;
   a bore through said polymeric member extending along said longitudinal axis;
   an adapter attached to said polymeric member, said adapter adapted to be fastened to a spindle of the turning machine and at least partially comprising a material harder than said polymeric member, whereby said adapter may be securely fastened to the spindle; and
   a bonding agent between said adapter and said polymeric member, the bonding agent bonding said polymeric member to said adapter.

10. The spindle liner of claim 9 wherein said adapter is attached to said polymeric member proximate an end of said polymeric member.

11. A spindle liner for a turning machine, the spindle liner comprising:
    an elongated polymeric member having first and second ends and a longitudinal axis extending from said first end to said second end;
    a bore through said polymeric member extending along said longitudinal axis; and
    an adapter attached to said polymeric member, said adapter adapted to be fastened to a spindle of the turning machine and at least partially comprising a material harder than said polymeric member, whereby said adapter may be securely fastened to the spindle, wherein said adapter is attached to said polymeric member intermediate said first and second ends of said polymeric member, such that, when said spindle liner is installed in the spindle, a portion of said polymeric member extends beyond an end of the spindle.

12. The spindle liner of claim 9 wherein said polymeric member comprises urethane.

13. The spindle liner of claim 9 wherein said bore is configured with one of a circular or a polygonal cross-sectional shape.

14. The spindle liner of claim 11, wherein said polymeric member has an outer surface, the spindle liner further comprising:
    an elongated metal sleeve coupled to said outer surface of said polymeric member and extending at least along a portion of said polymeric member.

15. The spindle liner of claim 14 further comprising:
    a bonding agent between said sleeve and said polymeric member, said bonding agent bonding said polymeric member to said sleeve.

16. The spindle liner of claim 1, wherein said polymeric corn has a length that is substantially the same as the length of said metal sleeve.

17. The spindle liner of claim 1, wherein said polymeric core has a length that is greater than the length of said metal sleeve.

* * * * *

UNITED STATES PATENT AND TRADEMARK OFFICE
CERTIFICATE OF CORRECTION

PATENT NO.   : 6,978,706 B2  Page 1 of 1
DATED        : December 27, 2004
INVENTOR(S)  : Berns Jr. et al.

It is certified that error appears in the above-identified patent and that said Letters Patent is hereby corrected as shown below:

<u>Column 10,</u>
Line 25, change "corn" to -- core --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,978,706 B2
DATED : December 27, 2005
INVENTOR(S) : Berns Jr. et al.

It is certified that error appears in the above-identified patent and that said Letters Patent is hereby corrected as shown below:

Column 10,
Line 25, change "corn" to -- core --.

This certificate supersedes Certificate of Correction issued April 11, 2006.

Signed and Sealed this

Second Day of May, 2006

JON W. DUDAS
*Director of the United States Patent and Trademark Office*